UNITED STATES PATENT OFFICE.

ANTON NATHAN BRAUN, OF ARAD, AUSTRIA-HUNGARY.

PROCESS FOR THE PRODUCTION OF STOVE-POLISH.

No. 809,279.     Specification of Letters Patent.     Patented Jan. 9, 1906.

Application filed August 12, 1905. Serial No. 273,977.

*To all whom it may concern:*

Be it known that I, ANTON NATHAN BRAUN, a subject of the King of Austria-Hungary, residing at Arad, Austria-Hungary, have invented a certain new and useful Process for the Production of Stove-Polish, of which the following is a specification.

This invention relates to a process for the production of so-called "stove-polish," adapted to impart to grates, stoves, and the like a white metallic appearance similar to that of silver.

The polish produced according to my invention need not be brushed after its application, since it dries within a few minutes after use and acquires a durable shine or luster. It does not give off smoke or develop an unpleasant odor when heated.

The process of manufacture will now be described, suitable mixing proportions of the constituents used being stated by way of example.

Twelve parts of gum-arabic are added to seventy-four parts of distilled water, the mixture being boiled with four parts of American spirits of turpentine while the gum-arabic is going into solution. Thirty parts of the product thus obtained are thereupon mixed with ten parts of a pulverized alloy consisting of aluminum and tin in equal proportions, the mixture being then diluted with the remainder of the dissolved gum-arabic and spirits of turpentine, with which it is stirred.

What I claim as my invention, and desire to secure by Letters Patent of the United States, is—

1. Process for the production of a stove-polish consisting in dissolving gum-arabic in distilled water, boiling the mixture with spirit of turpentine while the gum-arabic is dissolving, and adding a pulverized alloy of aluminium and tin substantially as described.

2. Process for the production of a stove-polish consisting in dissolving gum-arabic in distilled water, boiling the mixture with spirit of turpentine while the gum-arabic is dissolving, adding to part of this product a pulverized alloy of aluminium and tin, diluting the latter product with the remainder of the gum-arabic and turpentine solution and stirring the whole substantially as described.

3. Process for the production of a stove-polish consisting in dissolving twelve parts gum-arabic in seventy-four parts distilled water, boiling the mixture with four parts spirit of turpentine while the gum-arabic is dissolving, mixing thirty parts of the product with ten parts pulverized alloy of aluminium and tin in equal proportions, diluting the latter mixture with the remainder of the gum-arabic and turpentine solution and stirring the whole substantially as described.

In witness whereof I have signed this specification in the presence of two witnesses.

ANTON NATHAN BRAUN.

Witnesses:
     ERNEST MELLER,
     CHARLES E. BALTZO.